United States Patent [19]
Kozlovsky et al.

[11] Patent Number: 5,375,138
[45] Date of Patent: Dec. 20, 1994

[54] OPTICAL CAVITIES FOR LASERS

[75] Inventors: William J. Kozlovsky, Sunnyvale, Calif.; James M. Zavislan, Pittsford, N.Y.

[73] Assignee: International Business Machines Corporation, Armonk, N.Y.

[21] Appl. No.: 951,688

[22] Filed: Sep. 25, 1992

[51] Int. Cl.⁵ .............................................. H01S 3/08
[52] U.S. Cl. ...................................... 372/92; 359/326
[58] Field of Search ........................... 372/92, 94, 101; 359/326

[56] References Cited

U.S. PATENT DOCUMENTS

| | | | |
|---|---|---|---|
| 3,735,280 | 5/1973 | Johnston, Jr. | 331/94.5 |
| 3,746,879 | 7/1973 | Esaki et al. | 359/326 |
| 3,778,635 | 12/1973 | Giuliani | 359/326 |
| 3,983,406 | 9/1976 | Lax et al. | 359/326 |
| 3,988,593 | 10/1976 | Dewey | 359/326 |
| 4,739,507 | 4/1988 | Byer et al. | 372/22 |
| 4,809,291 | 2/1989 | Byer et al. | 372/75 |
| 4,841,541 | 6/1980 | Sziklas et al. | 372/22 |
| 4,885,478 | 7/1988 | Bartholomew | 359/326 |
| 5,007,694 | 4/1991 | Yamamoto | 359/326 |
| 5,077,748 | 12/1991 | Kozlovsky | 359/326 |
| 5,095,491 | 3/1992 | Kozlovsky et al. | 372/21 |
| 5,111,468 | 5/1992 | Kozlovsky et al. | 372/32 |
| 5,206,868 | 4/1993 | Deacon | 359/326 |

FOREIGN PATENT DOCUMENTS

| | | | |
|---|---|---|---|
| 0367341 | 10/1989 | European Pat. Off. | C09J 5/00 |
| 0393719 | 4/1990 | European Pat. Off. | G11B 7/00 |
| 3626446 | 2/1988 | Germany | B32B 3/12 |
| 1381087 | 1/1975 | United Kingdom | H01S 3/00 |

OTHER PUBLICATIONS

Katayama et al., "Multi-beam Magneto-Optical Disk Drive for Parallel Read/Write Operator" SPIE vol. 1078 Optical Data Storage Topical Meeting (Jan. 1989).

*Primary Examiner*—Rodney B. Bovernick
*Assistant Examiner*—Robert E. Wise
*Attorney, Agent, or Firm*—Lucas S. Chang; Philip R. Wadsworth

[57] ABSTRACT

Nonlinear optical cavities comprising a single or multiple ring paths for use with diode lasers are presented. In one embodiment, the total internal reflection surface of a monolithic or composite cavity is fabricated into a plurality of nonparallel planes. In another embodiment, a composite cavity with either a single end piece or a plurality of end pieces bound to a nonlinear resonator crystal is used to generate either a single or multiple ring paths. In several of the embodiments, incident laser beams entering one end of the cavity follow the ring paths and transmit from the other end of the cavity as a plurality of second-harmonic beams with a pre-defined spatial layout.

28 Claims, 8 Drawing Sheets

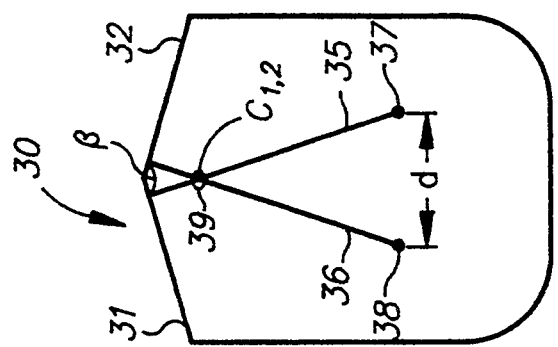
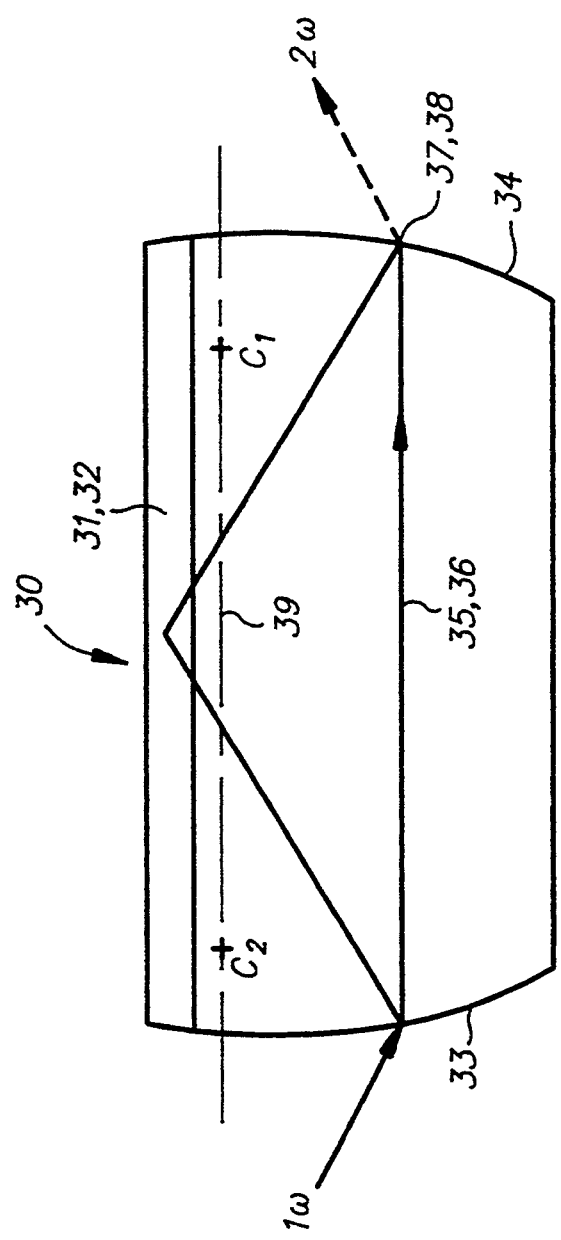
FIG. 2B
FIG. 2A

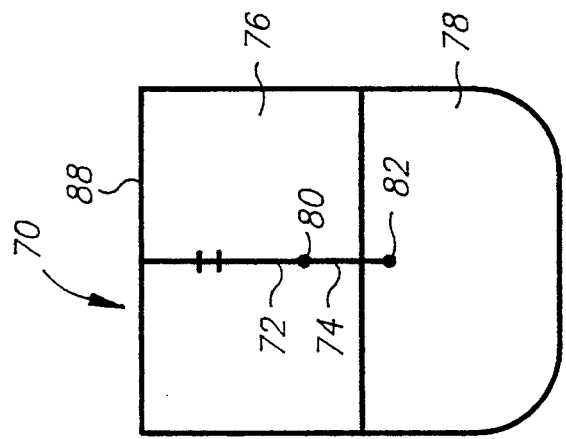
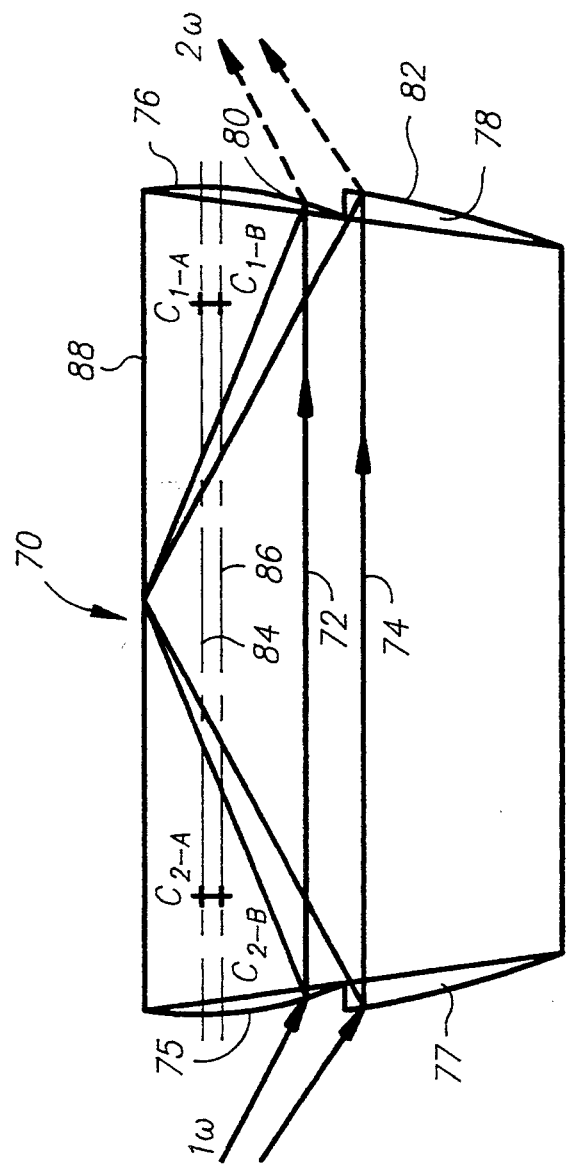
FIG. 6B
FIG. 6A

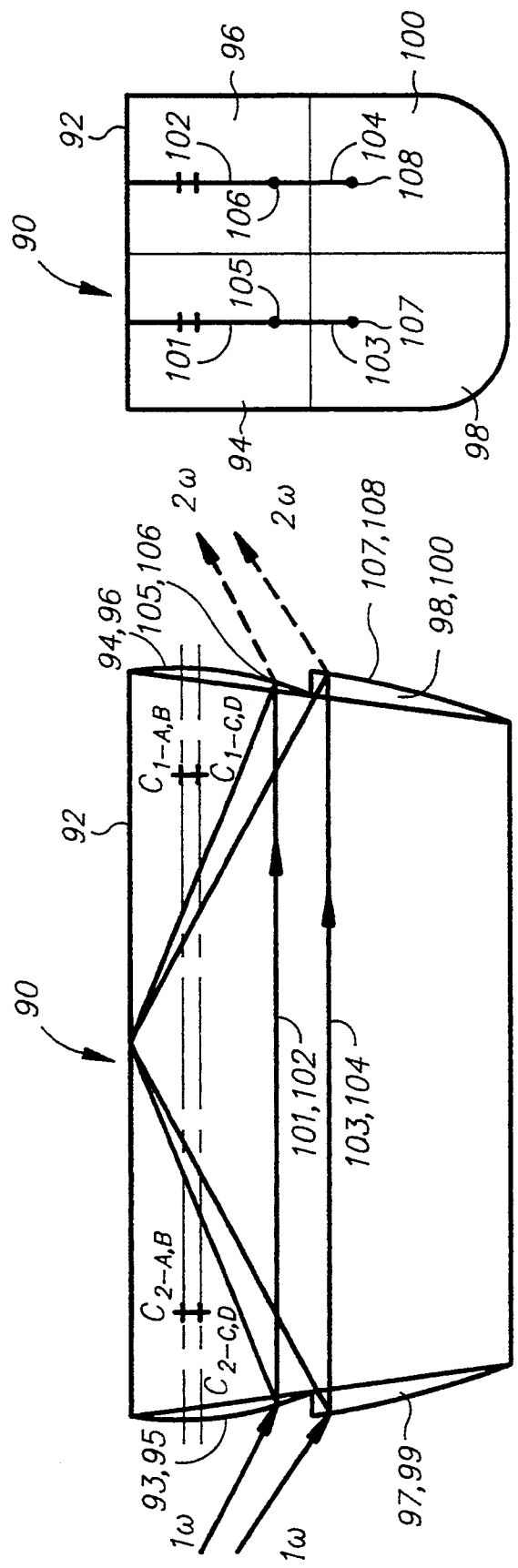

OPTICAL CAVITIES FOR LASERS

FIELD OF THE INVENTION

This invention generally relates to frequency doubling in laser systems and, more particularly, to a laser system in which a modified nonlinear optical cavity is used to produce single or multiple independent output beams in the visible to ultraviolet (uv) spectral region.

DESCRIPTION OF THE PRIOR ART

Laser sources of shorter wavelengths, e.g., "blue" or "green" lasers, are of interest for a number of applications including optical data storage, laser printing, color displays, and chemical, biochemical and medical analyses. For example, semiconductor diode lasers typically operate in the infrared region for writing and reading of digital data in an optical data storage system. A laser beam emitted from the diode laser is optically processed and focused on the optical disk to read, write or erase a binary bit. The diameter of the spot impinging upon a data track of the disk is approximately one-half the ratio of the wavelength to the numerical aperture of the focusing lens. For a gallium-aluminum-arsenide (GaAlAs) laser and a focusing lens having a numerical aperture of 0.5, the impinging spot on a disk is approximately 860 nm in diameter.

Various nonlinear optical processes, including frequency doubling, have been used to reduce the laser wavelength, whereby the diameter of the focused spot is reduced proportionally. If the laser wavelength is reduced by half, the diameter of the focused spot is also reduced by half. Correspondingly, a quadruple data storage density may result. Thus, typical infrared diode lasers, such as GaAlAs lasers, when converted into blue light beams by the frequency doubling method, can potentially increase the optical data storage areal densities by a factor of four, up to several gegabits per square inch.

One technique for converting light to a shorter wavelength (and a higher frequency) is known as second harmonic generation (SHG). A laser beam at a lower frequency is passed through a nonlinear crystal, such as potassium niobate ($KNbO_3$), producing a second harmonic laser beam at twice the frequency of the original laser beam. Recently, U.S. Pat. No. 5,111,468, to Kozlovsky et al., issued May 5, 1992, teaches the generation of a coherent and stable output in the blue spectral region from a diode laser by improving the conversion efficiency of the SHG process with a nonlinear resonator and by providing stable and efficient frequency locking between the diode laser and the nonlinear resonator.

Specifically, the above-mentioned U.S. Pat. No. 5,111,468 teaches a semiconductor laser apparatus comprising a DC power supply coupled with an RF source which generates a low-amplitude RF current. The combined DC/RF current is injected into a diode laser source, which emits a laser beam with a central carrier frequency having low-amplitude frequency sidebands generated by the RF current. An optical beam shaping system, which comprises a collimating lens, a prism circularizer, a Faraday isolator and a mode-matching lens, processes the laser beam and directs it to the nonlinear resonator, which has a plurality of longitudinal resonator frequencies with a fundamental spatial mode. The optically shaped laser beam substantially matches the fundamental spatial profile, while the central carrier frequency of the diode laser substantially matches one of the longitudinal resonator frequencies. The laser beam entering the nonlinear resonator takes a specific resonator path propagating down the optical axis of the nonlinear resonator to provide proper phase-matching for the SHG process. A second laser beam with a 50% shorter wavelength generated through frequency doubling is transmitted from the nonlinear resonator.

FIGS. 1A and 1B illustrate, respectively, a side view and an end view of a standard monolithic $KNbO_3$ resonator 10 used for frequency-doubling 856 nm light from a GaAlAs diode laser. In this cavity, the fundamental radiation ($1\omega$) 12 is incident on the first or left end 14, while the second-harmonic radiation ($2\omega$) 16 is transmitted from the second or right end 18. $C_1$ is the center of the curvature for the mirror at the first end 14, while $C_2$ is the center of curvature for the mirror at the second end 18. The line joining the centers of curvature of the end mirrors is the standing wave axis 20. The nonlinear cavity has a total internal reflection (TIR) surface 22. A portion of the particular ring resonator path 24 is properly phase-matched to convert the $1\omega$ light 12 to $2\omega$ radiation 16, which is transmitted out of the resonator at spot 26. This monolithic cavity 10 offers the advantage that only three bounces are required to obtain a ring path. This low number of bounces minimizes scatter losses upon reflection as well as provides a sufficiently long phase-matched path for efficient second harmonic generation.

The resonator 10 also reflects a portion of the incident, optically shaped laser beam to a photodetector, which generates an RF signal based on the difference in phase shifts or amplitude losses experienced by the RF sidebands caused by any frequency mismatch between the central laser frequency and the substantially matched longitudinal resonator frequency. This RF signal is fed into a RF mixer which compares the signal with an input signal from the RF source and generates an error signal as a feedback to the diode laser source for tuning the diode laser central carrier frequency. Thus, a stable and efficient frequency locking between the diode laser and the nonlinear resonator is accomplished.

Although U.S. Pat. No. 5,111,468 teaches the generation of a coherent and stable blue-laser output by virtue of efficient SHG conversion and effective frequency locking, the invention is limited to the generation of one output beam per nonlinear resonator. This is because each of the blue-generating optical cavities used thus far, including those set forth in U.S. Pat. No. 5,111,468, possesses a unique ring resonator path which can be accessed by only one diode laser beam, and as a result the number of output beams is limited to one. Nevertheless, it is often desirable to have a laser source with multiple output beams in applications such as optical storage or laser printing. For example, a Direct Read After Write (DRAW) system requires a second beam for verification of the writing process. Future storage systems will also require the parallelism of laser arrays for high data-rate applications. It is therefore desirable to have a resonator design that offers the choice of having a plurality of output beams from a single optical cavity. In addition, it is desirable to simplify the process and/or reduce the cost of fabricating the nonlinear optical cavity used in U.S. Pat. No. 5,111,468.

SUMMARY OF THE INVENTION

Accordingly, it is an object of the present invention to provide an optical device for generating a plurality of output optical signals by converting each of a plurality of input optical signals into an output signal having a different frequency from the respective input signal.

It is another object of the present invention to provide a low-cost, composite nonlinear optical cavity for converting either a single or a plurality of input optical signals into either a single or a plurality output optical signals in a shorter-wavelength spectral region.

It is a further object of the present invention to provide a nonlinear resonator for generating a plurality of ring resonator paths to convert multiple input beams into multiple independent shorter-wavelength output beams with a pre-defined spatial pattern.

In accordance with a particular embodiment of the invention, the total internal reflection (TIR) surface of an optical cavity comprising a monolithic nonlinear crystal is fabricated into a plurality of TIR planes, each pair of adjacent planes intersecting at an angle less than 180°. Incident laser beams entering one end of the crystal follow multiple ring resonator paths and transmit out of the other end of the crystal in the form of a plurality of second-harmonic beams.

In accordance with another embodiment of the invention, the TIR surface of an optical cavity made of a monolithic nonlinear crystal is fabricated into a plurality of TIR planes, each plane being vertically disposed from as well as nonparallel to each adjacent plane, such that the extensions of each pair of adjacent planes intersect at an angle less than 180°. Incident laser beams entering one end of the crystal follow multiple ring resonator paths and transmit out of the other end of the crystal in the form of a plurality of second-harmonic beams in a pre-defined pattern, e.g., a linear array.

In accordance with still another embodiment of the invention, a composite cavity is fabricated to have either a single or a plurality of lenses at each end of the crystal and as a result has either a single or a plurality of standing wave mirror axes and either a single or a plurality of ring resonator paths. Incident laser beams entering one end of the crystal follow either the single or the multiple ring resonator paths and transmit out of the other end of the crystal in the form of either a single or a plurality of second-harmonic beams.

In accordance with yet another aspect of the invention, an optical cavity is fabricated to have a plurality of lenses at each end of the crystal and either a single TIR plane or a plurality of TIR planes intersecting or extensions thereof intersecting at angles less than 180°. Incident laser beams entering one end of the crystal follow multiple ring resonator paths and transmit out of the other end of the crystal in the form of a plurality of second-harmonic beams in a pre-defined pattern, e.g., a two-dimensional array.

These and other objects and features of the present invention and the manner of obtaining them will no doubt become apparent to those skilled in the art, and the invention itself will be best understood by reference to the following detailed description read in conjunction with the various accompanying drawings.

BRIEF DESCRIPTION OF DRAWINGS

FIG. 2A is a side view of a monolithic ring cavity with two intersecting TIR planes for doubling two input lasers.

FIG. 2B is an end view of the ring cavity of FIG. 2A.

FIG. 6A is a side view of a composite ring cavity with two pairs of end lenses for doubling two input lasers.

FIG. 6B is an end view of the ring cavity of FIG. 6B.

FIG. 7A is a side view of a composite ring cavity with four pairs of end lenses for generating a 2×2 output array.

FIG. 7B is an end view of the ring cavity of FIG. 7A.

DETAILED DESCRIPTION OF THE INVENTION

Figure 1B:
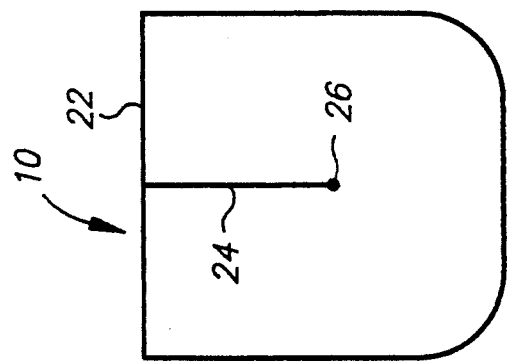
FIG. 1B is an end view of the ring cavity of FIG. 1A.
Figure 1A:
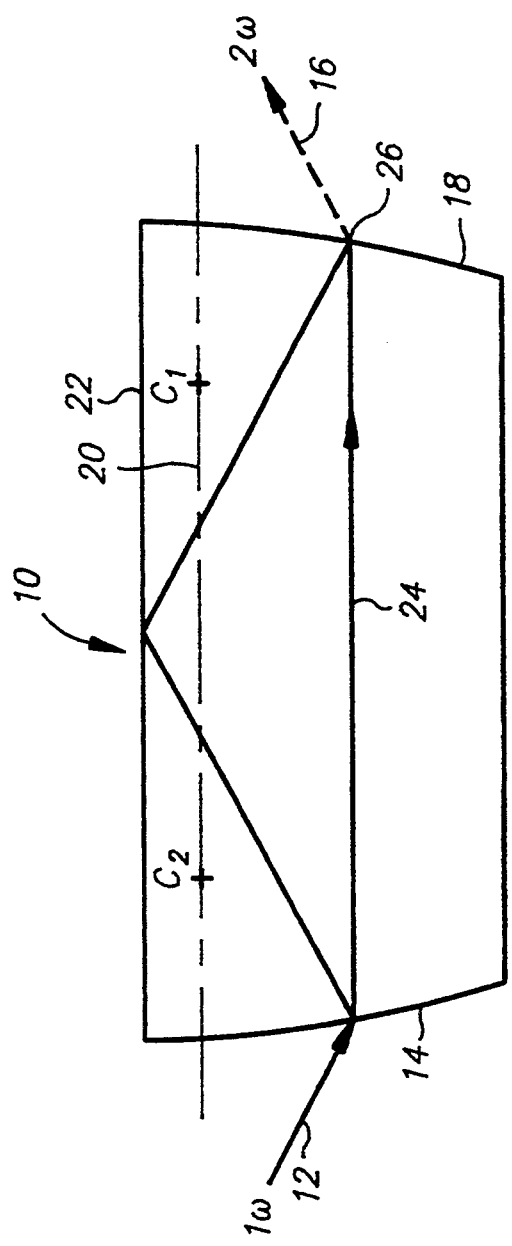
FIG. 1A is a side view of a standard monolithic KNbO$_3$ ring cavity used for frequency-doubling a 856 nm light from a GaAlAs diode laser.

While this invention may be embodied in many forms, several particular embodiments are schematically shown in FIGS. 2–7, with the understanding that the present disclosure is not intended to limit the invention to the embodiments illustrated.

In fabricating an optical cavity having a plurality of ring resonator paths, all paths must be chosen to provide proper phase-matching for the wavelengths of the laser sources. The ring paths of these three-bounce cavities must each lie in a plane that contains both the standing wave axis and a line normal to the total internal reflection (TIR) surface.

In a particular embodiment of the present invention, a monolithic resonator crystal is polished to generate curved surfaces at both ends of the crystal and a plurality of TIR planes with varying orientations. Reflective materials, such as dielectric or metal coatings, may be deposited on those polished surfaces. FIGS. 2A and 2B depict such a monolithic ring cavity 30 with two TIR planes 31 and 32 intersecting at an angle $\beta$ which is less than 180°. Dielectric mirrors 33 and 34 are deposited, respectively, on the two polished end surfaces by techniques well-known in the art. $C_1$ is the center of the curvature for the left mirror 33, while $C_2$ is the center of curvature for the right mirror 34. The line joining the centers of curvature of the end mirrors is the standing wave axis 39. The two TIR planes 31 and 32 in FIG. 2B have different normal directions, which result in two ring paths 35 and 36. The separation d between the two input or output beams, e.g., between spots 37 and 38 at the second end of the nonlinear crystal, can be adjusted by varying the angle $\beta$.

As a particular example, consider a 7-mm long, 2-mm wide, and 2-mm high LiNbO$_3$ crystal for generating "green" beams. The bottom edges of the nonlinear crystal can be either straight or curved, even though curved edges are shown in FIG. 2B. The radii of curvature of either end mirror is 5 mm. Both TIR planes 31 and 32 have a width of $(1000)/(\sin \beta/2)$ microns. Given a distance of 320 microns from the standing wave axis 39 up to either TIR plane, the input beams are introduced into the cavity at a distance of 750 microns below the standing wave axis 39. The horizontal separation between the two input spots, d, is easily determined to be $d=(2)(750)(\cos \beta/2)$. The cavity can be designed to match this separation of input spots as they are imaged from the diode laser source onto the mirror face. Given a circularizer ratio of 3 and a focal-length ratio of 25 (i.e., the ratio of the focal length of the mode-matching lens to that of the collimator lens), a 50-micron diode laser separation results in a 417-micron laser beam separation on the surface of the crystal. This spot separation requires a $\beta$ of 148°. The spot separation becomes 167 microns and $\beta$ becomes 167° for a 20-micron diode laser separation. After the nonlinear cavity is fabricated, the separation of the spots on the cavity surface can be adjusted slightly by varying the circularization ratio used on the collimated diode laser beams to match the exact cavity fabrication.

Those skilled in the art will realize that the above-mentioned "roof-edge" TIR surface may be fabricated by well-known techniques such as those for fabricating a roof prism. The separation of the resonator paths at the points where they reflect off their respective TIR planes is also easily geometrically determined. This separation is usually sufficient to ensure that a Gaussian beam is clipped well beyond the $1/e^2$ power point, as is well-known in the art to ensure low-loss resonator propagation. For instance, in the example above where $\beta=167°$, this separation is 70 microns, which is significantly larger than the 17-micron $1/e^2$ radius on the TIR surface.

By using large $\beta$'s such as those used above, reflection losses caused by bireflection in biaxial materials, e.g., potassium niobate, can be reduced to the same level as the typical 2% total linear round-trip losses for monolithic resonators. On the other hand, using uniaxial materials such as lithium niobate would totally eliminate this additional loss.

Those skilled in the art will also recognize that the input laser sources can be either separate lasers or independent lasers on a monolithic substrate, i.e., a laser array. The beam waist of each diode laser must be correctly positioned relative to each other and the cavity for efficient second-harmonic generation. This may be accomplished by moving the sources and modifying the optical properties of the imaging system which collects the laser radiation and directs the beams to the nonlinear cavity.

The alignment of the laser sources can be done in various ways. One technique is to couple each laser to a single-mode fiber by direct connection or imaging. The output ends of the fibers are positioned relative to an optical system having correct numerical aperture and nominal magnification so that the beams are properly imaged into the cavity. The fine-positioning and tilt control of each of the fiber ends provide further adjustment. In the case of a monolithic laser array with fixed laser spacing, extra flexibility may be provided by a multi-configuration (zoom) optical system, e.g., a reverse telephoto arrangement or a periscope system.

Figure 3B:
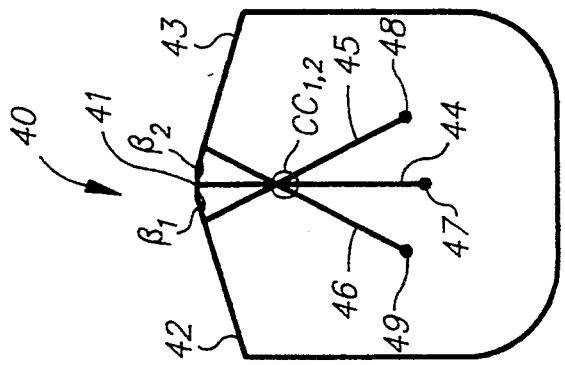
FIG. 3B is an end view of the ring cavity of FIG. 3A.
Figure 3A:
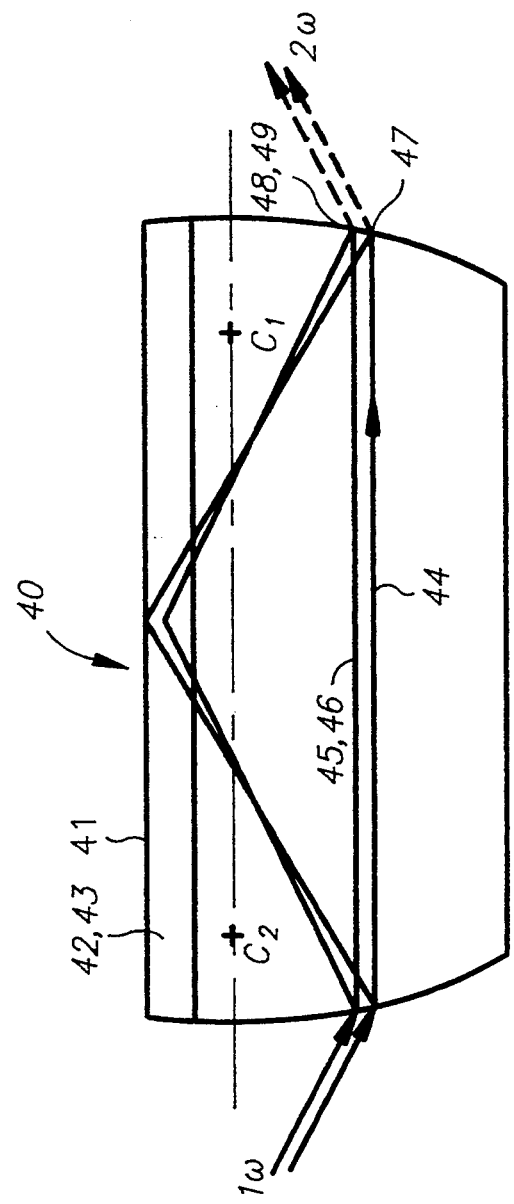
FIG. 3A is a side view of a ring cavity with three intersecting TIR planes for doubling three input lasers.

As another particular embodiment of the present invention, a monolithic ring cavity 40 having three TIR planes 41, 42 and 43 is illustrated in FIGS. 3A and 3B. The line joining $C_1$ and $C_2$, the centers of curvature of the end mirrors, is the standing wave axis. The two side TIR planes 42 and 43 intersect with the central TIR plane 41 at angles $\beta_1$ and $\beta_2$, respectively. All three TIR planes have different normal directions, resulting in three ring paths 44, 45 and 46 as well as three laser beam output spots 47, 48 and 49.

As a particular example, consider a 7-mm long, 2-mm wide, and 2-mm high $LiNbO_3$ crystal for generating three "green" beams. The bottom edges of the nonlinear crystal can be either straight or curved, even though curved edges are shown in FIG. 3B. The radius of curvature of either end mirror is 5 mm. The TIR planes are fabricated such that $\beta_1=\beta_2=167°$, that the width of the central TIR plane 41 is 70 microns, and that the width of each side TIR plane 42 and 43 is 990 microns. Given a distance of 320 microns from the standing wave axis up to any of the three TIR plane 41, 42 or 43, the input beams are introduced into the cavity at a distance of 750 microns below the standing wave axis. The separation between the output spots 47 and 48, or that between the output spots 47 and 49, is easily geometrically determined to be 167 microns. The cavity can be designed to match this separation of input spots as they are imaged from the diode laser source onto the mirror face. Thus, the 167-micron spot separation would require a 20-micron diode laser separation. In addition, after the nonlinear cavity is fabricated, this spot separation can be adjusted slightly by varying the circularization ratio used on the collimated diode laser beams to match the exact cavity fabrication.

Figure 4B:
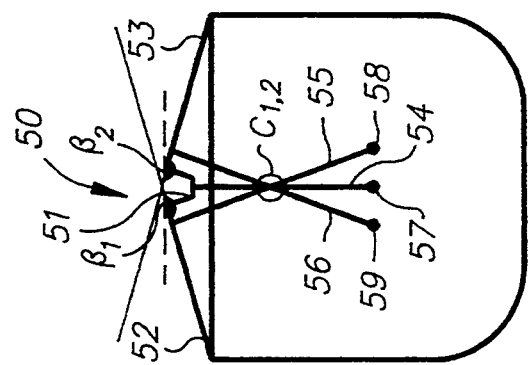
FIG. 4B is an end view of the ring cavity of FIG. 4A.
Figure 4A:
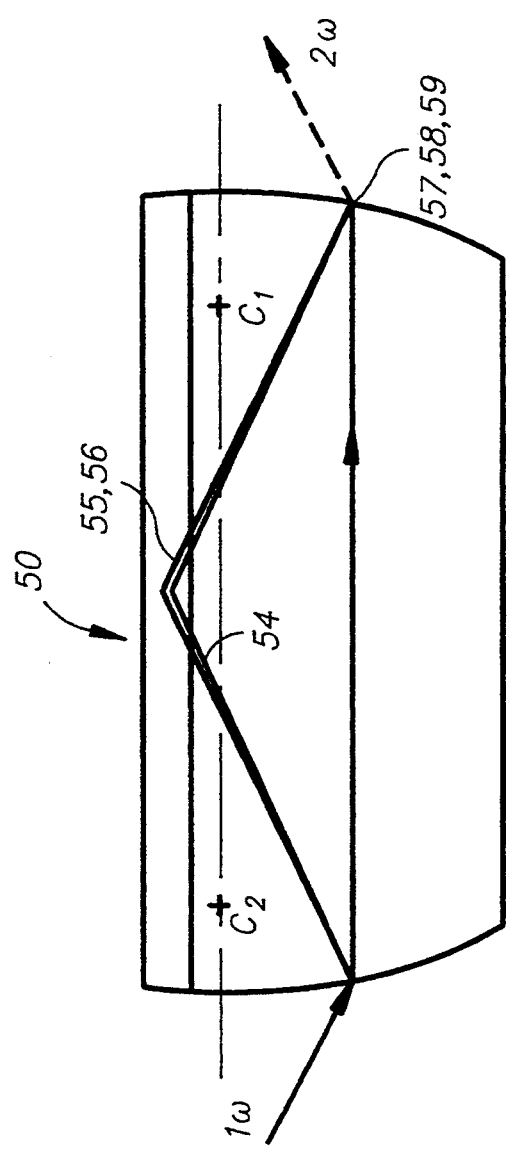
FIG. 4A is a side view of a ring cavity with three adjacent, vertically disposed TIR planes for generating a three-laser output array.

As still another particular embodiment of the present invention, a monolithic ring cavity 50 having a vertically disposed, central TIR plane 51 and two adjacent TIR planes 52 and 53 is illustrated in FIGS. 4A and 4B. Similar to the embodiment in FIGS. 3A and 3B, $C_1$ and $C_2$ are the centers of curvature for the end mirrors. The line joining $C_1$ and $C_2$ is the standing wave axis. The three TIR planes 51, 52 and 53, or the geometrical extensions thereof, would intersect at angles $\beta_1$ and $\beta_2$. The three TIR planes 51, 52 and 53 have different normal directions, resulting in three ring paths 54, 55 and 56 as well as three laser beam output spots 57, 58 and 59. By adjusting the "step-down" as well as the two angles $\beta_1$ and $\beta_2$ in FIG. 4B, the three output beams leave the ring cavity 50 at spots 57, 58 and 59, forming a linear array with pre-determined separations.

As a particular example, consider a 7-mm long, 2-mm wide, and 2-mm high $LiNbO_3$ crystal for generating three "green" beams. The bottom edges of the nonlinear crystal can be either straight or curved, even though curved edges are shown in FIG. 4B. The radius of curvature of either end mirror is 5 mm. The TIR planes are fabricated such that $\beta_1=\beta_2=167°$, that the width of the central TIR plane 51 is 70 microns, that the width of each side TIR plane 52 and 53 is 990 microns, and that the central plane 51 is vertically disposed down from the top edges of the side TIR planes 52 and 53 by a distance of 10 microns. Given a distance of 310 microns from the standing wave axis up to the central TIR plane 51, and a distance of 320 microns from the standing wave axis to each of the side TIR planes 52 and 53, the input beam corresponding to the central TIR plane 51 is introduced into the cavity at a distance of 731 microns below the standing wave axis, whereas the two input beams corresponding to the side TIR planes 52 and 53 are introduced into the cavity at a distance of 750 microns below the standing wave axis. The separation between the output spots 57 and 58, or that between the output spots 57 and 59, is easily geometrically determined to be 167 microns. The cavity can be designed to match this separation of input spots as they are imaged from the diode laser source onto the mirror face. Thus, the above 167-micron spot separation would require a 20-micron diode laser separation. In addition, after the nonlinear cavity is fabricated, this spot separation can be adjusted slightly by varying the circularization ratio used on the collimated diode laser beams to match the exact cavity fabrication.

Those skilled in the art will realize that a compound TIR surface resulting in a linear output array, or a plurality of output beams with any pre-defined spatial layout, may be fabricated to the extent allowed by well-known techniques such as those for fabricating roof prisms or injection molding.

Figure 5:
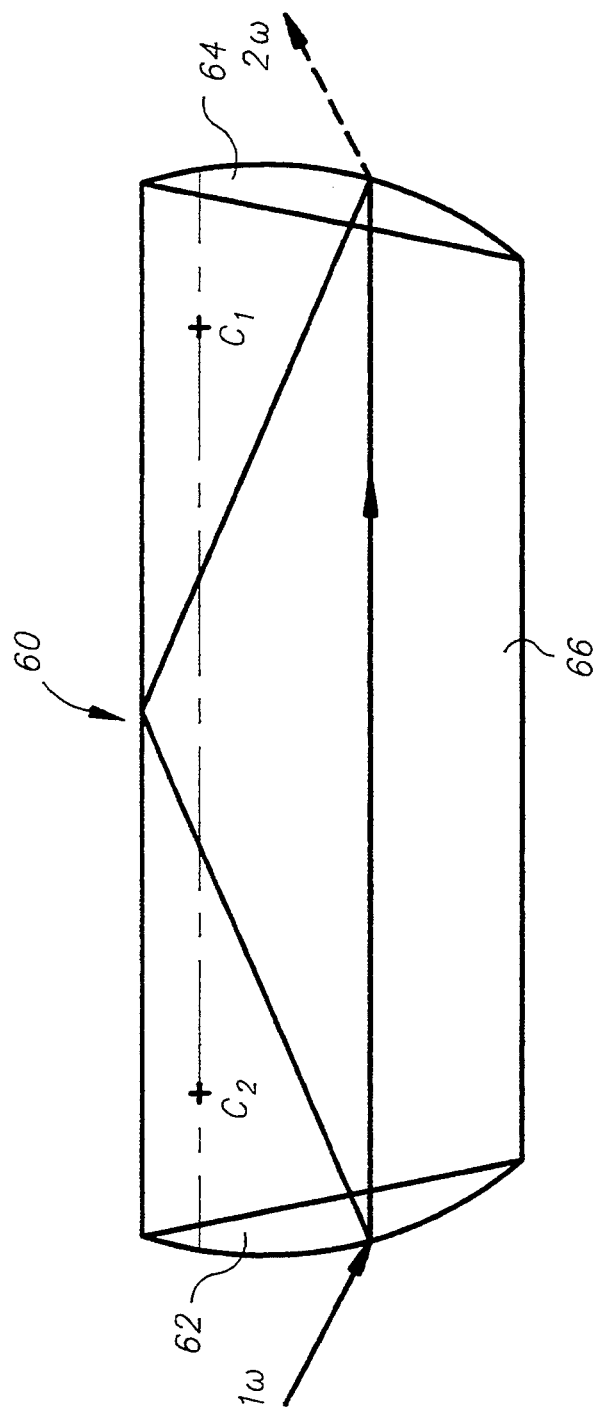
FIG. 5 is a side view of a three-part composite ring cavity for doubling a 856 nm light from a GaAlAs diode laser.

Instead of a monolithic cavity, a simple, low-cost composite ring cavity 60, depicted in FIG. 5, may be fabricated in three parts, i.e., two lenses 62 and 64 with appropriate radii of curvature (e.g., 5 mm for a 7 mm long crystal) and a central prism 66 made of a nonlinear material, e.g., $KNbO_3$. Because this technique allows the curved end surfaces to be fabricated separately, it is particularly suitable for those nonlinear materials which are difficult to polish. Additionally, through the reduction of losses due to scattering sites and crystallographic imperfections in the nonlinear prism 66, the frequency-doubling efficiency can be maximized by varying the placement of the lens pieces.

Referring again to FIG. 5, $C_1$ and $C_2$ are the centers of curvature for the two lenses 62 and 64, respectively. The line joining $C_1$ and $C_2$ is the standing wave axis. The two lenses 62 and 64 are brought into contact with the nonlinear prism 66 and held in place. The lenses 62 and 64 may be fabricated from the same material as the prism 66 and brought into an optical contact with the prism 66, or they may be fabricated from any material with similar thermal expansion coefficient as that of the prism 66 and bonded to the prism 66 using, e.g., adhesive layers. If the refractive index of the prism 66 is substantially larger than that of the adhesive, an antireflection coating as is well known in the art may be applied to the contact surfaces of the prism 66. The adsorption and scattering in the adhesive layers as well as at the interfaces are likely to be negligible. As an example, a 6-micron-thick layer of the uv-curable Norland 61 Optical Adhesive made by Norland Products Incorporated would result in less than 0.03% adsorption/scattering loss at the prism/lens interface. The total additional round-trip losses at 856 nm over that of a monolithic design due to the additional surfaces, coatings and adhesive layers would be less than 0.3%, which is negligible in view of the typical 2% total linear round-trip losses for monolithic potassium niobate resonators.

Having described in detail the fabrication of a three-part composite cavity for doubling 856 nm light from a GaAlAs diode laser, another embodiment of the present invention is depicted in FIGS. 6A and 6B, in which two ring paths 72 and 74 are generated by two pairs of end pieces 75-76 and 77-78 fabricated and bonded to the nonlinear crystal. $C_{1-A}$ and $C_{2-A}$ are the centers of curvature for the two lenses 75 and 76, respectively, while $C_{1-B}$ and $C_{2-B}$ are the centers of curvature for the two lenses 77 and 78, respectively. Two output laser beams with a doubled frequency are transmitted out of the cavity 70 at spots 80 and 82. The end pieces comprise separate lenslet pieces or molded glass lenslet with properly formed multiple-curvature surfaces. In the specific example depicted in FIG. 6A, the spacing between the output spots 80 and 82 is determined by the separations of the two standing wave axes 84 and 86 relative to the TIR plane 88, and can be adjusted to match the diode laser array beam separation on the cavity surface.

As a particular example, consider a 7-mm long, 2-mm wide, and 2-mm high $KNbO_3$ crystal for generating two "blue" beams. The bottom edges of the nonlinear crystal can be either straight or curved, even though curved edges are shown in FIG. 6B. The radius of curvature of each lenslet is 5 mm. The output spot 80 will lie 750 microns below the standing wave axis 84 if the latter axis 84 is placed 320 microns from the TIR plane 88. A separation of 420 microns between output spots 80 and 82 may be obtained by placing the standing wave axis 86 at a distance 463 microns from the TIR plane 88, resulting in a 1027-micron separation between the axis 86 and the output spot 82.

For molded lens pieces, the distance between the centers of curvature $C_{1-A}$ and $C_{1-B}$, and that between $C_{2-A}$ and $C_{2-B}$, must be designed correctly. These two distances are equal when the two standing wave axes are parallel. On the other hand, if separate lenslet pieces are used for the two end surfaces, the proper placement must be set during assembly of the composite resonator. Any small deviation of the beam separation on the cavity surface can be adjusted by small changes in the magnification in the prism circularizer.

The two $2\omega$ beams of the particular embodiment shown in FIGS. 6A and 6B are apparently not parallel. However, alignment of the output beams can be done by means of a number of techniques known in the art, such as a zoom optical system. On the other hand, by adjusting individually the aforesaid distances between the centers of curvature of the end pieces during their fabrication, parallel output beams may be generated even though the two standing wave axes will no longer be parallel. Non-parallel ring paths can be phasematched by the proper selection of the orientation of the nonlinear material, as is known to one skilled in the art, or by using laser beams having different wavelengths.

As still another particular embodiment of the present invention, a composite ring cavity 90 having a TIR plane 92 and four pairs of end pieces 93-94, 95-96, 97-98 and 99-100 is fabricated and bonded to the nonlinear crystal and is shown in FIGS. 7A and 7B. $C_{1-A}$ and $C_{2-A}$ are the centers of curvature for the two lenses 93 and 94, respectively; $C_{1-B}$ and $C_{2-B}$ are the centers of curvature for the two lenses 95 and 96, respectively; $C_{1-C}$ and $C_{2-C}$ are the centers of curvature for the two lenses 97 and 98, respectively; and $C_{1-D}$ and $C_{2-D}$ are the centers of curvature for the two lenses 99 and 100, respectively. Four ring paths 101-104 are generated, resulting in the transmission of four output laser beams with doubled frequencies out of the cavity 90 at spots 105-108, which form a 2×2 array. The end-piece sets, (93, 95, 97, 99) and (94, 96, 98, 100), each having a two-dimensional layout, comprise separate lenslet pieces or molded glass lenslet with properly formed multiple-curvature surfaces. Similar to the embodiment relating to FIGS. 6A and 6B, the separation between resonator paths 101 and 103 (or between 102 and 104) in the specific embodiment of FIGS. 7A and 7B is determined by the separations of their respective standing wave axes relative to the TIR plane 92, and can be adjusted to match the diode laser array beam separation on the cavity surface.

As a particular example, consider a 7-mm long, 3-mm wide, and 2-mm high $KNbO_3$ crystal for generating four "blue" beams. The bottom edges of the nonlinear crystal can be either straight or curved, even though curved edges are shown in FIG. 7B. The radius of curvature of each lenslet is 5 mm. The distances between the output spots can each be independently adjusted. For example, similar to the embodiments relating to FIGS. 6A and 6B, the output spots 105 and 107 in FIG. 7B are separated by a vertical distance of 420 microns. On the other hand, the horizontal distance between output spots 105 and 106 is independently determined by the separation between their corresponding standing wave axes. Thus, the separations of the centers of curvature for the multiple end pieces must be designed correctly. Finally, the ring paths 101-104, or more precisely their corresponding standing wave axes, need not be parallel to each other. In fact, they may be individually adjusted during the fabrication of end pieces, such that the output beams may transmit from the cavity in any pre-determined orientations, e.g., four parallel $2\omega$ beams.

While the above specific embodiments disclose the generation of either blue light, using potassium niobate and GaAlAs diode lasers, or green light, using lithium niobate and strained layer diode lasers, the generation of other wavelengths such as red, violet, ultraviolet, etc., are also possible. Other nonlinear crystals, such as lithium potassium, niobate, lithium in diffused lithium niobate, lithium iodate, KTP, KTA, barium borate, LBO, periodically poled KTP and lithium niobate, etc., will permit phase-matched SHG using a number of fundamental frequencies, generated from various laser systems such as GaAlAs diode lasers, InGaAs strained-layer lasers, InGaAsP lasers, AlGaInP lasers, diode-pumped solid-state lasers, etc.

Those skilled in the art will recognize that the aforementioned ring cavities, or any variations thereof, can be readily used in an optical data storage system, such as those taught in U.S. Pat. No. 5,111,468, or variations thereof, for the generation of multiple output beams with a doubled frequency.

Figure 8:
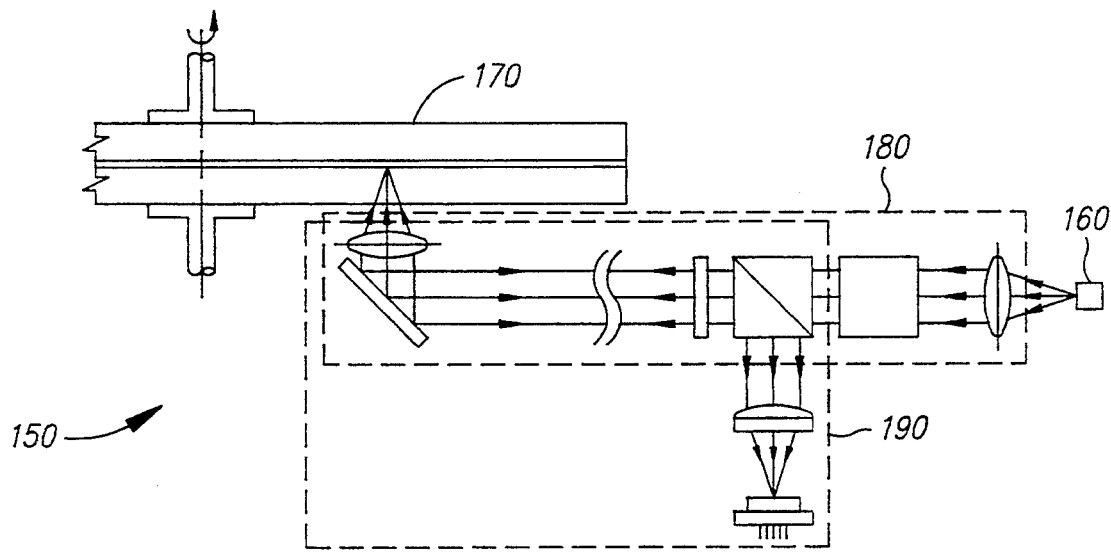
FIG. 8 is schematic representation of an optical data storage system implementing a multiple-path cavity of the present invention.

FIG. 8 depicts an optical data storage system similar to the one shown in U.S. Pat. No. 5,111,468. This optical data storage system 150 includes a multiple-output laser system as the light source 160, an optical recording medium 170, an optical transmission system 180 comprising conventional elements for directing the output laser beams from the light source 160 to the recording medium 170, and an optical reception system 190 comprising conventional elements for receiving reflected laser beams from the recording medium 170 and providing data signals responsive to these reflected beams. The laser system 160 comprises a multiple-path optical cavity of the present invention for the generation of multiple output beams with a doubled frequency.

Those skilled in the art will also recognize that the aforementioned ring cavities, or any variations thereof, can be readily used in a magneto-optical data storage system, such as those taught in U.S. Pat. No. 5,111,468, or variations thereof, for the generation of multiple output beams with a doubled frequency.

Figure 9:
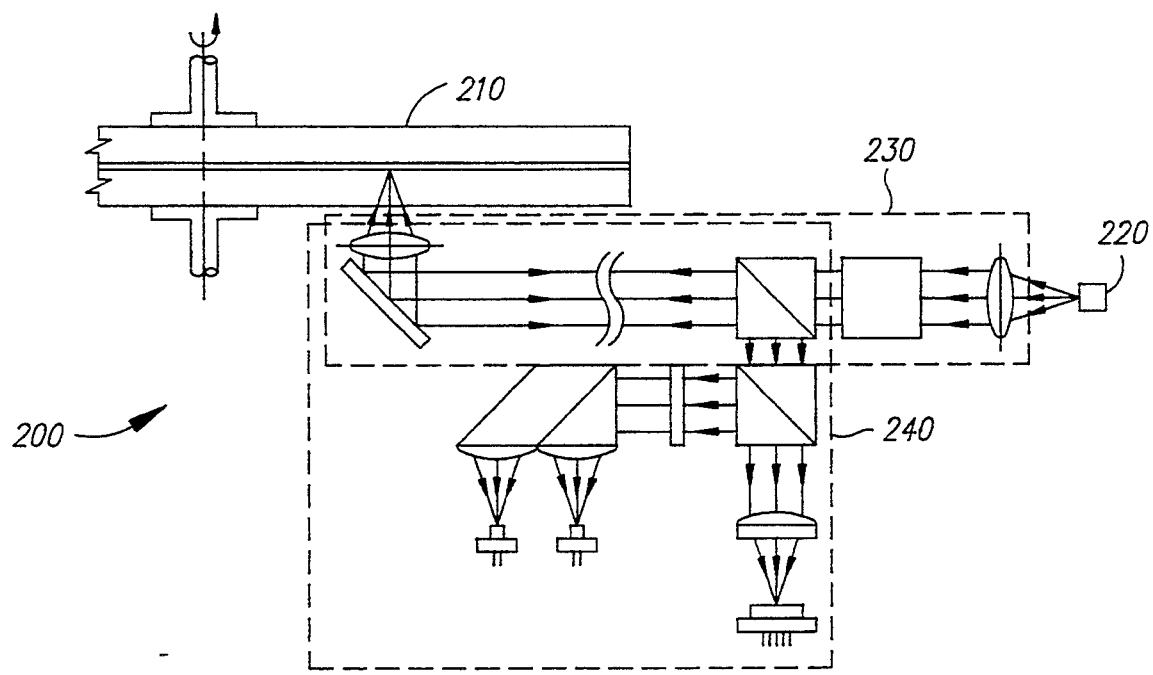
FIG. 9 is schematic representation of a magneto-optical data storage system implementing a multiple-path cavity of the present invention.

FIG. 9 depicts a magneto-optical data storage system 200, similar to the one shown in U.S. Pat. No. 5,111,468, in which data is stored and read from data tracks disposed on a recording medium such as a disk 210. This data storage system 200 includes a multiple-output laser system as the light source 220, an optical system 230 comprising conventional elements for focusing each of the output laser beams onto the disk tracks for the recording, erasing or reading processes, and a control system 240 comprising conventional elements for controlling the track access and the light intensities and focuses. The laser system 220 comprises a multiple-path optical cavity of the present invention for the generation of multiple output beams with a doubled frequency.

Those skilled in the art will realize that the foregoing descriptions have been presented for the purposes of illustration and description only. It is not intended to be exhaustive or to limit the invention to the precise form disclosed, and obviously many modifications and variations suited to the particular use contemplated are possible in light of the above teachings.

What is claimed is:

1. An optical device comprising an optical cavity including a plurality of optical inputs for receiving a plurality of different input optical signals, a plurality of optical outputs for outputting a plurality of different output optical signals, and means for converting each said input optical signal into an output optical signal having a frequency different from said respective input signal.

2. An optical device of claim 1, wherein said optical cavity comprises a nonlinear resonator.

3. An optical device comprising a nonlinear resonator for receiving a plurality of input optical signals, said nonlinear resonator including a plurality of total internal reflection planes intersecting at angles less than 180° to convert each said input signal into an output optical signal having a frequency different from said respective input signal.

4. An optical device of claim 3, wherein said total internal reflection planes are vertically disposed from each other.

5. An optical device of claim 4, wherein said nonlinear resonator is a potassium niobate nonlinear ring resonator.

6. An optical device of claim 4, wherein said nonlinear resonator is a lithium niobate nonlinear ring resonator.

7. An optical device of claim 3, wherein said nonlinear resonator is a potassium niobate nonlinear ring resonator.

8. An optical device of claim 3, wherein said nonlinear resonator is a lithium niobate nonlinear ring resonator.

9. An optical device comprising a nonlinear ring resonator for converting an input optical signal into an output optical signal having a frequency different from the input signal, said resonator including a section of nonlinear material having an input end and an output end, an input element connected to said input end for receiving the input signal and an output element connected to said output end for outputting the output signal.

10. An optical device comprising a nonlinear ring resonator for converting a plurality of input optical signals into a plurality of output optical signals, each output signal having a frequency different from each said respective input signal, said resonator including a section of nonlinear material having an input end and an output end, an input element in optical cooperation with said input end and an output element in optical cooperation with said output end, said input element having a plurality of input end pieces, each said input piece having an optical input for receiving an input optical signal, and said output element having a plurality of output end pieces, each said output piece having an optical output for outputting an output optical signal.

11. An optical device of claim 10, wherein said nonlinear ring resonator is a potassium niobate ring resonator.

12. An optical device of claim 10, wherein said nonlinear ring resonator is a lithium niobate ring resonator.

13. An optical device comprising an optical cavity for receiving a plurality of input optical signals, said cavity including a nonlinear ring cavity having two ends and a plurality of separate lenslet pieces in contact with each said end to convert said plurality of input optical signals into a plurality of output optical signals, each output signal having a frequency different from each respective said input signal.

14. An optical device of claim 13, wherein said end pieces are molded glass lenslets having polished multiple-curvature surfaces.

15. An optical device of claim 14, wherein said nonlinear ring cavity is a potassium niobate nonlinear ring resonator.

16. An optical device of claim 14, wherein said nonlinear ring cavity is a lithium niobate nonlinear ring resonator.

17. An optical device of claim 13, wherein said nonlinear ring cavity is a potassium niobate nonlinear ring resonator.

18. An optical device of claim 13, wherein said nonlinear ring cavity is a lithium niobate nonlinear ring resonator.

19. An optical device comprising an optical cavity for receiving a plurality of input optical signals, said cavity including a nonlinear ring cavity having two ends, a plurality of nonparallel total internal reflection planes, and a plurality of end pieces bound to each of said two ends to form a plurality of standing wave axes to convert each said input signal into an output optical signal having a frequency different from said respective input signal.

20. An optical device of claim 19, wherein each of said total internal reflection planes is vertically disposed from each adjacent said plane.

21. An optical device of claim 19, wherein said end pieces are separate lenslet pieces.

22. An optical device of claim 19, wherein said end pieces are molded glass lenslets having properly polished multiple-curvature surfaces.

23. A laser system comprising:
a laser source for generating a plurality of different input optical signals; and
a nonlinear resonator including a plurality of optical inputs and a plurality of optical outputs for receiving said plurality of input optical signals and for generating a plurality of different output optical signals, each said output signal from said nonlinear resonator being associated with a respective input signal and having a frequency different from said respective input signal.

24. An optical cavity of claim 23, wherein said nonlinear resonator is a potassium niobate nonlinear ring resonator.

25. An optical cavity of claim 23, wherein said nonlinear resonator is a lithium niobate nonlinear ring resonator.

26. A method for generating a plurality of different output optical signals using a nonlinear resonator having a plurality of optical inputs and a plurality of optical outputs, comprising the steps of:
generating a plurality of different input light beams;
directing each said input beam to a corresponding optical input of said nonlinear resonator;
generating a plurality of different output light beams, each said output beam being generated from a corresponding optical output of said nonlinear resonator and being associated with a respective input beam and having a frequency different from said respective input beam.

27. An optical data storage system comprising a light source, an optical recording medium, an optical transmission means for directing a plurality of output light beams emitted from said source to said medium, and an optical reception means for receiving a reflected light beam from said medium and providing a data signal responsive thereto, wherein said light source further including: means for generating a plurality of input light beams; an optical cavity for receiving said plurality of input light beams; said cavity having means for converting each said input light beam into a respective said output light beam having a frequency different from said input light beam.

28. A magneto-optical data storage system in which data is stored and read from a plurality of data tracks disposed on a disk, said storage system having a magnetic field source for generating a magnetic field for data recording, erasing and reading, said storage system further including a light source generating a plurality of output light beams and an optical system to focus each said output light beam onto the disk tracks for the recording, erasing or reading processes, said storage system further including a control system controlling the track access, the light intensity and focuses, said light source further comprising: means for generating a plurality of input light beams; an optical cavity for receiving said plurality of input laser beams; said cavity having means for converting each said input light beam into a respective said output light beam having a frequency different from said input light beam.

* * * * *